No Printed Specification Available

7605X

2 Sheets-Sheet 1.

B. Kugler,

Wood Planing Machine.

Patented June 3, 1833:

AM. PHOTO-LITHO. CO. N.Y. (OSBORNE'S PROCESS)

No Printed Specification Available
7605X
2 Sheets. Sheet 2.
B. Kugler,
Wood Planing Machine.
Patented June 3, 1833.
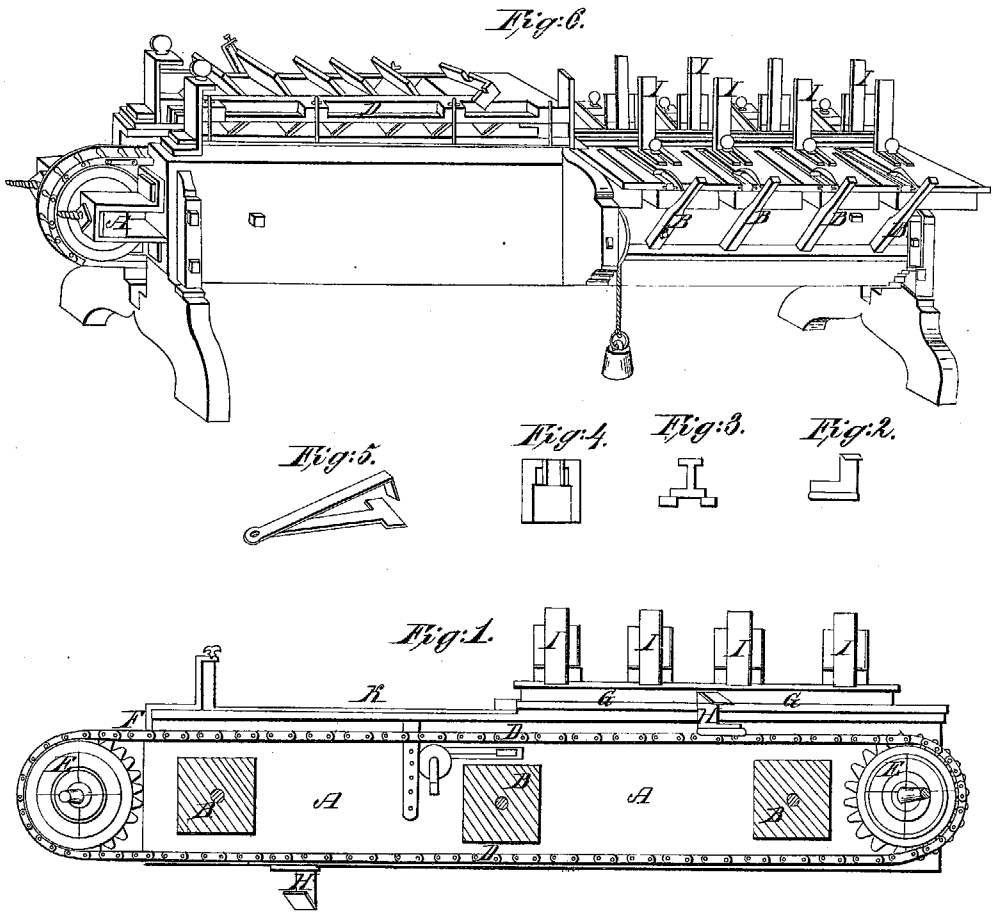
AM. PHOTO-LITHO. CO. N.Y. (OSBORNE'S PROCESS)

17605X

June 5 1839

Benjamin Kugler Phil. Penn

Letters Patent

The schedule referred to in these Letters Patent and making part of the same con=taining a description in the words of the said Benjamin Kugler himself of his improvement called "Kuglers planing machine".

To all persons to whom these presents shall come Benjamin Kugler of the City of Philadelphia and State of Pennsylvania sends greeting.

Be it known that I the said Benjamin Kugler have invented constructed made and applied to use a new and useful improvement in the method of planing tongue-ing and grooving and cutting into mouldings either plank boards or any other material and for reducing the same to an equal width and thickness viz a new and useful machine called Kuglers planing machine specified in the words follow-ing viz. This improvement and machine is thus described. ........

Figure 1:
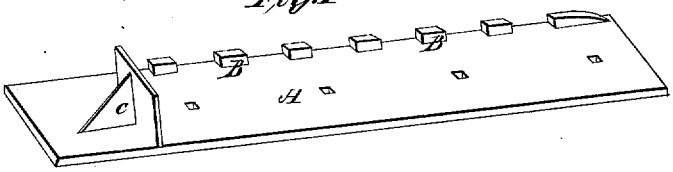

Two pieces of timber (called the timbers) from twelve to sixteen inches square and about forty feet long are to be placed horizontally and parallel to each other about nine inches apart and well secured on a solid foundation (Pl. 1. Fig 1. AA) they are kept at the proper distance by blocks (Pl 1 Fig 1 B.B.B.)

On the inner face of each timber and at the distance of about three inch=es from the top is to be cut a groove two inches wide and one in depth run-ning horizontally the whole length of the timber and called the groove. (or which is more advisable) the groove as above described may be made of cast iron or other metal and let into the timber (Pl. 1 Fig 1 FF)

On the top of the Timbers and well secured thereto by screw-bolts is placed horizontally the Holding box of a rectangular shape open at both ends and large enough every way to contain and admit of a free passage for the largest widest and thickest board intended to be planed (Pl 1 Fig 1 CC) Through the centre of the bottom of the Holding Box (which must be direct-ly over the centre of the space between the timbers) there must be a longi-tudinal opening called the Neck Slit, about two inches wide running the whole length of the box so as to leave a free passage for the neck of the Dog hereinafter described. The holding Box must be as long as the longest board
intended to be planed and capable of being adapted (by means of movable
and lateral gauges, (Pl 1 Fig 1 & C. 111) to the different widths of the board in
-tended to be planed. The top of the Holding Box may be left open in which
case the Box must be fed through the top, and the board next above the one ac-
-tually in the box will form its top. If the top of the Holding Box be not left open
the side must be so left in which case the Box must be fed through the side.
Both these modes of feeding the Box are hereinafter described.

Figure 5:
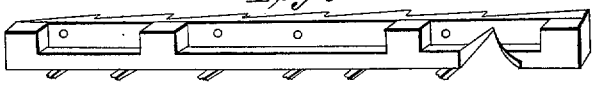

On the timbers at the end of and contiguous to the Holding Box is placed
the Planing Box, (Pl 1 Fig 1 D) of a rectangular shape open at both ends, about
seven feet long, wide enough to admit the boards as hereinafter described
and having a longitudinal opening (called the neck slit Pl 2. Fig 5 A)
through the centre of the bottom extending the whole length of the Planing Box and
of the same width as the neck slit in the Holding Box. The Planing Box is to be
so placed that the upper surface of the bottom thereof shall be in a horizontal line
with the upper surface of the bottom of the Holding Box and that the neck slits of the two
Boxes shall form one straight line. The bottom and sides of the Planing Box
are thus made. There should be a rectangular plate of cast iron (called a bottom
plate Pl 2 Fig 1 A) seven feet long, one foot wide and one inch thick perfectly flat
on the under surface and having on the upper surface perpendicular thereto and
exactly flush with the inner edge thereof as many rectangular blocks (called
bottom blocks Pl 2 Fig 1 BBB) as there are to be planing [illegible] [illegible]) each
four inches long extending lengthwise along the bottom plate three-quarters of an
inch wide and one inch high with a space or interval of two inches between
each. At the posterior end of the bottom plate is placed a Stay (Pl 2 Fig 1 C) to pre-
-vent the side and top plates from moving backwards.

Figure 3:
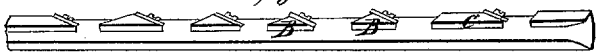
Figure 2:
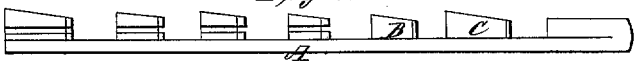

The bottom plates and bottom blocks
and stay to be cast in one piece. This plate is to be securely fixed by screw-bolts
to one of the timbers in such a position that the bottom blocks shall form one side
of the neck slit while their upper surface forms part of the upper surface of the
bottom of the Planing box. Another and corresponding bottom plate and
blocks is in like manner to be secured to the other timber. There must be
two other rectangular plates of cast iron (called side Plates Pl 2 Fig 2 & 3 A)

each of them three feet long six inches wide and one inch thick perfectly flat on the under surface and having on the upper surface as many triangular blocks (called side blocks Pl. 2 Fig 2&3 B) as there are to be planing bitts. The base of each to be four inches long extending lengthwise along the side plate and the apex of each to be on the outer edge of the side plate with a space or interval of two inches between the respective ends of the bases each corresponding with the intervals between the bottom blocks. The anterior end of the base of each side block is to be at the distance of one quarter of an inch from the inner edge of the side plate and the posterior end of the base of each side block is to be at the distance of five sixteenths of an inch from the inner edge of the side plate.

The anterior side of each side block is to be at an angle of forty five degrees with the line of the inner edge of the side plate. The first side block Pl. 2 Fig 2. & 4 C) (viz: the one which is nearest to the Holding Box) is to be at its anterior corner of the thickness of the board when en-tering the plane and the last side block is to be at its anterior corner exactly of the thickness to which the board is to be reduced by the plane. The intermediate side blocks are to be graduated between these two extremes. Each side block is to be one sixteenth of an inch thicker at its posterior than at its anterior cor-ner the upper surface of each (Pl. 2 Fig 3 B B) thus forming a plane at an angle with the horizon and fitting exactly the under surface of the top of the Planing Box to be hereinafter described. On the anterior sides of the four first blocks on each side plate are screwed Cutter Bits on the remaining eight side blocks of one of the side plates are screwed tonguing bits and on the other Grooving Bits. Each side plate with its side blocks ought to be cast in one piece. All the castings herein mentioned are of course expected to be reduced to the necessary accuracy and smooth by the file.

When the side plates are laid upon the bottom plates the side and bottom blocks will correspond with each other respectively. The side plates are to be placed upon the bottom plates the bases of the side blocks forming the sides of the planing Box The side plates are moveable on the bottom plates so as to be adapted to the differ-ent widths of the boards to be planed they are so placed as to converge towards the posterior end according to the amount of the proposed reduction of the width of the board and they are secured in the proper position by screws passing through the bolts hereinafter described for fastening down the top of the planing Box

7605X

Figure 6:
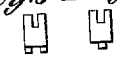
Figure 6:
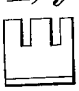
Figure 4:
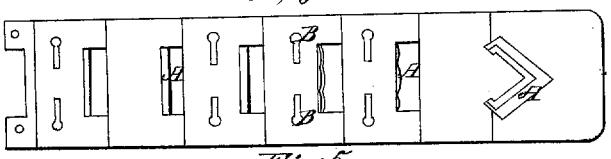

The top of the Planing Box is a rectangular plate of cast iron (called the top plate, Pl 2 Fig 4 & 5) seven feet long about sixteen inches wide and about three inches thick
having longitudinal opening through the centre six feet long and as wide as
the widest board intended to be planed to save expense in casting the top plates
may be cast thinner between the places through which the screw bolts pass. as in
the drawing Fig 6.

Figure 8:
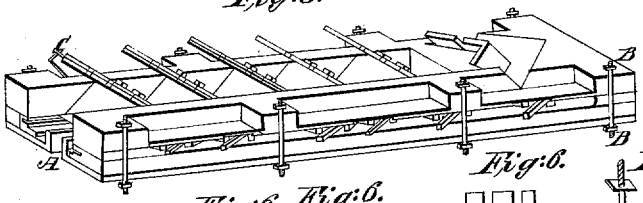
Figure 7:
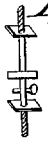

In this opening are placed as many triangular blocks (called top blocks)
as there are to be planing bits the bases of the top blocks to be four and a quarter
inches wide and as long as the opening in the top plate is wide, and the an-
-terior side of each top block to form an angle of forty five degrees with the
base, the bases of the top blocks being part of the under surface of the top plate
between the ends of the bases of the respective top blocks intervals or spaces
are left of one & three quarter inch. on the anterior sides of the top blocks, are
placed the cutting Bits to be fastened by screws or otherwise as hereinafter
described, the cutting bits may of course be of any kind polished or
plain and set [illegible] or obliquely (Pl 2 Fig 4 [illegible]) The top blocks and
top plates are to be cast in one piece. The under surface of the top plate is to be
first filed perfectly level then from the first cutting bit (viz the one nearest
the [illegible] Box) to the second and so from each cutting bit to the one next
behind it the under surface of the top plate is filed at such an angle as to
correspond with and exactly fit into the upper surfaces of the side blocks herein-
-before described The top plate rests on the upper surfaces of the side blocks and
is fastened down by four large screw bolts (Pl 2 Fig 7 & Fig 8 B) on each side pass-
-ing through the timbers and bottom plates but outside of the side plates so as to
bind all the parts of the planing box firmly together in each of these screw bolts
are holes to admit screws which pass through horizontally and regulate lat-
-erally the position of the side plates slots may be cut in the top plate (Pl 2
Fig 4 BBB) through which the screw bolts may pass through the side plates
and thus secure them the bolts being movable in the slots so as to
admit of the position of the side plates being altered laterally The cutting bits may be secured
by being set in slots having a spring at the bottom to push the bit up where it is two teeth; on the top at each side is a piece of iron (Pl 2 Fig 8 C) turning on a
[illegible] and ending in a rectangular joint on through which a screw passes
When the arm is turned so as to lay along on the top of the cutting bit the screw will
operate directly on the same and depress it to its proper place. In the upper part
of the cutting bit there are two holes into which a hook may be inserted to draw
out the bit.

Two Wheels (Pl 1 Fig 1 EE) are to be placed one at each end of the timber
one of which acts as a friction wheel and may be cogged the other is attached
to the moving power and must be cogged so as to act upon an endless plate
chain (Pl 1 Fig 1 DDD) of about twenty nine feet in length passing over the two
wheels and on which are firmly fixed two or more dogs at equal intervals.
It is better to have the dogs cast on the respective links of the chain to which they
are attached. The friction wheel must be on sliding pedestals so as to tighten
or loosen the chain. The dogs (Pl 1 Fig ) are thus made. the lower part called
the foot (Pl 1 Fig 4) is about two inches thick eighteen inches long and eleven inches
wide so that when passing between the timbers it will fit and run easily
in the grooves. The foot must be cast hollowed along the middle of the bottom thereof,
so as to allow the cogs of the wheel to work in the links of the chain under the dog.
At right angles from the centre of the foot the neck (Pl 1 Fig 2 & 3) about four
inches long and two inches wide so as to fit and run easily in the neck slit
rises to such a height as to be level with the upper surface of the bottom of the
Holding Box. The Head (Pl 1 Fig 2 & 3) is fixed at right angles on the top of the
neck being about three quarters of an inch high two inches wide and half
an inch in length less than the width of the board intended to be planed.
The Head may be moveable and screwed on in front of the neck by having a
neck piece coming down in front of the neck and screwed thereto by means of
screws. The wheels must be so placed that when the endless chain and dogs
are placed round them and the machine set in motion the dogs will pass
horizontally between the timbers fitting in the grooves the neck passing through
the neck slit and the head in the cavity of and just along the upper surface
of the bottom of the Holding and Planing Boxes (Pl 1 Fig 1).

The Machine may be fed in either of
two ways viz by the sides or by the top of the Holding Box. In the first case one side of the holding box is open for the reception of the board a number of boards are piled immediately along side of the opening thus left which are kept in their proper position by upright gauges of a suitable height (Pl 1 Fig 6 nn). A convenient number of arms (Pl 1 Fig 6 BBB) are attached to a lever (Pl 1 Fig 1 c) which turns upon a pivot and one end of which is so placed that the dog immediately on leaving the Holding Box shall press the lever and by means of a rope passing around an axle (Pl 1 Fig 6 BB) it advances the pushers (Pl 1 Fig 3) which act upon the lowest board in the pile so as to push it into the Cavity of the Holding Box ready to be taken by the next dog. This being effected a weight and pulley (Pl 1 Fig 4) attached to the arms cause them to fall back and the lever to re-sume its original position.

The better mode of feeding is believed to be through the top in which case the Holding Box is open at the top instead of one of the sides, upright gauges being carried to a proper height the boards to be planed are piled directly [illegible] the cavity of the Holding Box. The lowest board in the pile will of course be in the Holding Box ready to be taken by the dog; the board next above it will form the top of the box, and when the other leaves the box will in its turn fall into the cavity thereof. The pile must always be composed of a sufficient number of boards to keep the lower board (by their vertical pressure) from bending up-wards in consequence of the force applied at one end to push it into and through the plane.

All the groove and side and top plates are flared at the entrance end and the first bottom block is also flared so as to admit easily and guide the endless chain and feet and heads of the dogs respecti-vely and the boards. A boy may attend to throw on boards gradually so as to keep the pile of a proper height. Of course the holding box may be fed through either the top or side by hand by putting one board at a time into it. The dogs are intended to push the boards through the Holding and planing boxes, the holding box is for the purpose of holding and guiding the board while it is pushed into and through the Plane; the sides keeping it in the true position laterally and the top and bottom preserving its horizon-tal direction as well as preventing it from bending or breaking while it is pushed into and through the planing box.

7605X

In the planing box the desired object is to reduce the board to the required thickness and width and at the same time plane, tongue and groove it, by taking off successive shavings each so thin as not to occasion a resistance too difficult to overcome or which may endanger the bits or other parts of the machinery or require them to be made of greater strength than may be done with convenience. There can of course be no invariable fixing the precise thickness of each shaving. In practice so far I have found it convenient to reduce the board by passing it through the planing box one quarter of an inch in thickness and the same in width and the description given above is of a machine calculated for such a reduction. Each cutting bit therefore will take off about one forty eighth of an inch in thickness; each jointer bit about one thirty secondth of an inch in width; the tonguing and grooving bits of course make the tongue and groove merely without reducing the absolute width of the board.

The bottom of the planing box being horizontal while the last cutting bit is one quarter of an inch lower than the first it follows that the general inclination of the top plate is downwards from the anterior to the posterior end. If therefore the under surface of the top plate were a plane, it would follow that in passing from each cutting bit to the next one the board would be forced through a diminishing cavity not equal to its own thickness and through which therefore it could not pass without very great friction and difficulty and being actually compressed. To avoid this inconvenience the under surface of the top plate is cut upwards and backwards from each cutting bit to the one next behind it as hereinbefore described so that the part of the surface between every two cutting bits forms a reverse angle to the one formed with the horizon by the general inclination of the top plate. The consequence of this and a similar expedient applied to the side blocks is that the board passes through the planing box with the least possible friction and without touching any part except the bottom thereof and the edges of the several bits. The wheels and endless chain being put in motion it is evident that the first dog will act upon the end of the board in the holding box and push it clear through that and the planing box; as soon as the board has left 366. 7605X the holding box another board is supplied and ready for the next dog
which is then about to enter the holding box. The planes must of course
operate with proper accuracy when properly constructed and used; it is
hence important not to strain or run the risk of breaking any part of the
machinery. Sometimes the head of the dog may get under the end of the
board in consequence of its being split or otherwise defective in which case
if the planing box be fastened down it is evident ~~that~~ either that the machine
must stop or that some part of it must give way. It may frequently hap
-pen also that a board will ~~well~~ require to be more reduced in width or
thickness or both than is proposed to be done by one passing through the planing
box. It is my intention therefore first to pass the board through the machine
without fastening down the top plate and without the tonguing or grooving
bits and when the end of the board shall have been thus tested and the board
itself reduced to within one quarter of an inch of the desired width and
thickness then to to pass it through with the top plate fastened by screws
springs or weights and the machine arranged as hereinbefore described.
The references herein are to the drawings annexed hereto. I claim as
new and my original invention ---
1st The mode of constructing the Holding box and the machine
in which the board is therein prevented from binding or breaking
or swerving from its proper direction and free egress given to it into the
planing box while the force for pushing it through is applied by the
dog at the end of the board.-
2d The construction of the Planing Box and the combination and
arrangement of the bits therein and the mode in which friction is
diminished by the arrangement of the [illegible] angles as above described
and I do not claim as new and my original invention any other
part of the machine above described. In testimony that the above is a
true specification of my said improvement as above described I have here
-to set my hand and seal the twenty fifth day of May in the Year of our
Lord one thousand eight hundred and thirty three.

Benjn [illegible]

Exd. W.G.

Witnesses
W. M. Meredith
John Barnes (Granted June 3, 1833) ([illegible])

([illegible])